United States Patent [19]

Sato

[11] Patent Number: 4,616,311
[45] Date of Patent: Oct. 7, 1986

[54] DATA PROCESSING SYSTEM

[75] Inventor: Fumitaka Sato, Oome, Japan

[73] Assignee: Tokyo Shibaura Denki Kabushiki Kaisha, Kawasaki, Japan

[21] Appl. No.: 727,197

[22] Filed: Apr. 29, 1985

Related U.S. Application Data

[63] Continuation of Ser. No. 604,423, Apr. 30, 1984, abandoned, which is a continuation of Ser. No. 308,516, Oct. 5, 1981, abandoned.

[30] Foreign Application Priority Data

Oct. 3, 1980 [JP] Japan .............................. 55-137575

[51] Int. Cl.⁴ ............................................... G06F 9/00
[52] U.S. Cl. ....................................................... 364/200
[58] Field of Search ... 369/200 MS File, 900 MS File

[56] References Cited

U.S. PATENT DOCUMENTS

| | | | |
|---|---|---|---|
| 3,647,348 | 3/1972 | Smith et al. | 364/200 X |
| 3,825,904 | 7/1974 | Burk et al. | 364/200 |
| 4,057,848 | 11/1977 | Hayashi | 364/200 |
| 4,130,870 | 12/1978 | Schneider | 364/200 |
| 4,145,738 | 3/1979 | Inoue et al. | 364/200 |
| 4,169,284 | 9/1979 | Hogan et al. | 364/200 |
| 4,170,039 | 10/1979 | Beacon et al. | 364/200 |
| 4,241,401 | 12/1980 | De Ward et al. | 364/200 |
| 4,374,410 | 2/1983 | Sakai et al. | 364/200 |

OTHER PUBLICATIONS

Computer Storage Systems and Technology, Matick; John Wiley Publications, 1977, pp. 532–619.

*Primary Examiner*—Gareth D. Shaw
*Assistant Examiner*—John G. Mills
*Attorney, Agent, or Firm*—Oblon, Fisher, Spivak, McClelland & Maier

[57] ABSTRACT

A data processing system having an address conversion system for translating a virtual address into a real address, including a main memory for storing instructions and data and a second memory for storing an address conversion table including a plurality of entries, each of which consists of a plurality of control bits and a portion of a real address. A central processing unit executes the instruction stored in the main memory according to a microprogram. An addressing means addresses the second memory by a continuous portion, which includes the effective upper most bit of the virtual address for the address conversion and for updating of the conversion table. The main memory need not store the conversion table.

3 Claims, 7 Drawing Figures

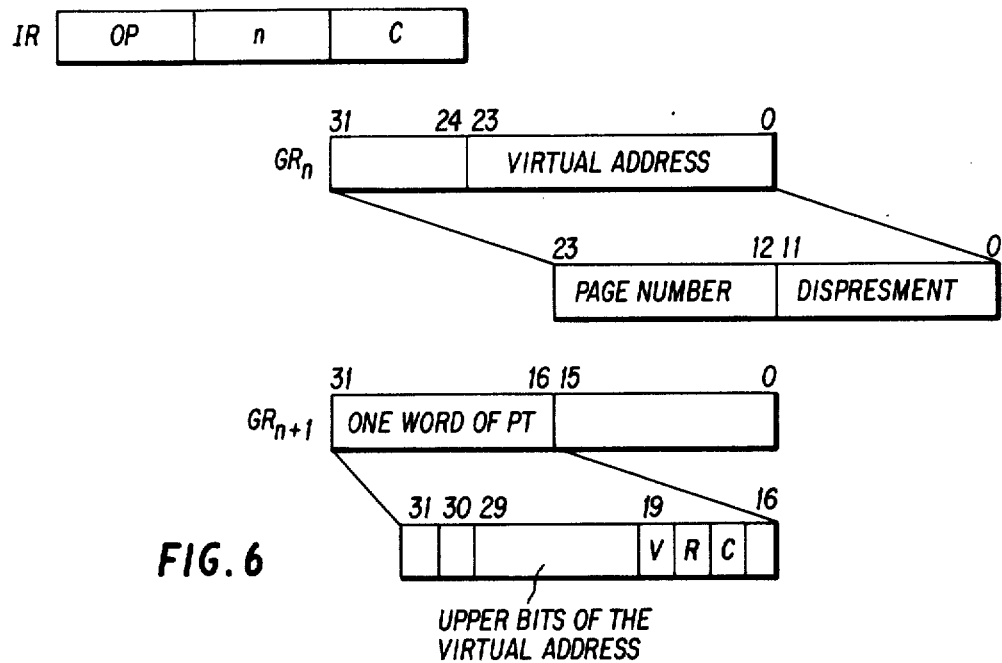
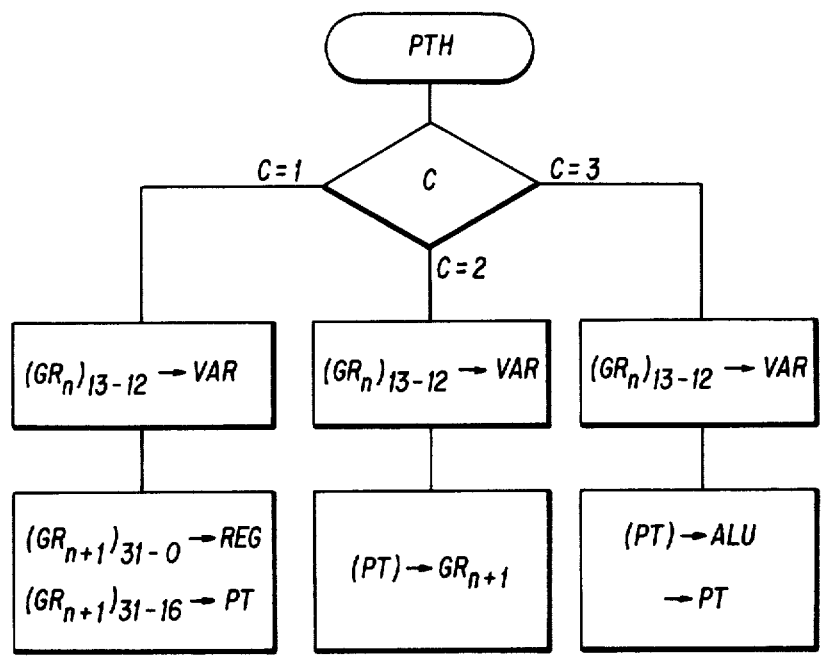
FIG. 6
FIG. 7

DATA PROCESSING SYSTEM

This application is a continuation of abandoned application Ser. No. 604,423, filed Apr. 30, 1984, which is a continuation of abandoned parent application Ser. No. 308,516, filed Oct. 5, 1981.

BACKGROUND OF THE INVENTION

1. Field of the Invention

The present invention relates to a novel data processing system and more particularly to a virtually memory data processing system and the address conversion techniques for such a system.

2. Description of the Prior Art

A virtual memory system provides users with much a larger memory space than that of the main memory. A central processing unit (CPU) is provided with hardware called a dynamic address translator (DAT) for automatic translation of user's virtual memory space into the real memory space. The DAT includes an associative memory system as its major element.

FIG. 1 illustrates a prior art data processing system of this type. The data processing system includes the central processing unit CPU 11, an input/output channel (I/O channel) 10, and the main memory MM 14. A page table 15 is located in a portion of the main memory 14 for storing the relationship between the virtual address and the real address. This address relationship is often expressed by two tables, one of which is called a segment table and the other of which is called the page table. In the present invention, the two tables are together referred to as the page table.

The central processing unit CPU 11 includes a dynamic address translator DAT 12 to translate the virtual address into the real address by referring to the page table 15. Usually, the dynamic address translator DAT 12 includes the hardware of a so-called translation look-aside buffer TLB 13 for improving the speed of the address translation by storing the recently accessed portion of the page table 15 in the translation look-aside buffer TLB. These virtual addressing systems and their associated hardware are well known and thus will not be discussed in detail herein. Such systems are described in manuals, for example, "A guide to the IBM 4341 Processor Section 15" (GC20-1877) published by the IBM corporation.

In the prior art systems, the system architecture is designed aiming to minimize hardware costs and to improve the speed of the address conversion. However, recently there have been rapid improvements in semiconductor memory elements and thus it is easy and inexpensive to use such memory elements to form memories having large capacities and short memory access time. In view of these developments in hardware technology, such prior art conversion systems and their associated hardware are becoming obsolete.

In the prior art address conversion, the operating system OS can freely initialize and update the page table with general instructions, because the page table is stored in the main memory. However, as will be described below, the page table of the present invention is designed outside the main memory as will be described below. Thus, it is impossible to address the page table with the general instructions. In prior art technology as currently used, the operating system (OS) often adopts a static paging scheme rather than demand paging. In the static paging scheme, a group of pages relating to each other are processed as a whole in order to improve the efficiency of the system and also to shorten the system response time. It is important both for efficiency and response time purposes that the operating system can perform the static paging for a plurality of pages, even though there is no page table in the main memory, as disclosed in this specification.

A translation look-aside buffer (TLB) 13 of the prior art is shown in FIG. 2. In FIG. 2 the translation look-aside buffer TLB translates the virtual address space of a total of 16 MB megabytes divided into pages for unit of KB (kilobytes) and addressed by a virtual address of 24 bits into the real address of a maximum of 4 megabytes. The translation look-aside buffer TLB includes a set associative system, which is common in conventional translation look-aside buffers. The memories 21 and 24 store the upper bits of the virtual address accessed recently and the memories 22 and 25 store the upper bits of the real address corresponding to them.

For instance, assume that the memories have a capacity of $2^N$ words. The portion of the virtual address, except the lower portion of 12 bits, is called a page number portion. The page number portion of the virtual address addresses the memories 21, 22, 24, and 25 with its lower N bits, and the comparators 23 and 26 compare the upper bits of the virtual address read from them with the remainder of the virtual address. The output of the comparators 23 and 26 are connected to the enable terminals of the memories 22 and 25, respectively. Thus, if the comparator 23 detects a coincidence, the real address corresponding to the associative address is read from the memory 22. Similarly if the comparator 26 detects a coincidence, the real address corresponding to the virtual address is read from the memory 25.

SUMMARY OF THE INVENTION

Accordingly, an object of the present invention is to provide a data processing system having an improved address conversion for translating a virtual address into a real address.

It is another object of the present invention to provide an improved data processing system wherein the page table is not included in the main memory but is included in the dynamic address translator; thus allowing a user's program to fully utilize the main memory.

It is another object to provide a simple hardware paging implementation which has only similar size of hardware as conventional translation look aside buffer due to recent LSI memory development, and includes the entire page table.

To achieve the above-mentioned objectives, the present invention provides a data processing system including a main memory for storing an instruction, a central processing unit for executing the instruction in the main memory according to a microprogram, a second memory for storing an address conversion table for composing a plurality of control bits and a portion of the real address, an addressing means to address the second memory by a continuous portion of the virtual address. The portion includes the effective most upper bit of the virtual address, thus simplifying the conversion scheme.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 6 illustrates the format of an instruction for the operation of the page table according to the present invention and illustrates the use of the general register with the instruction for the page table; and FIG. 7 is a flow chart illustrating the processing of the operation instruction of the page table.

DETAILED DESCRIPTION OF THE PREFERRED EMBODIMENTS

Figure 1:
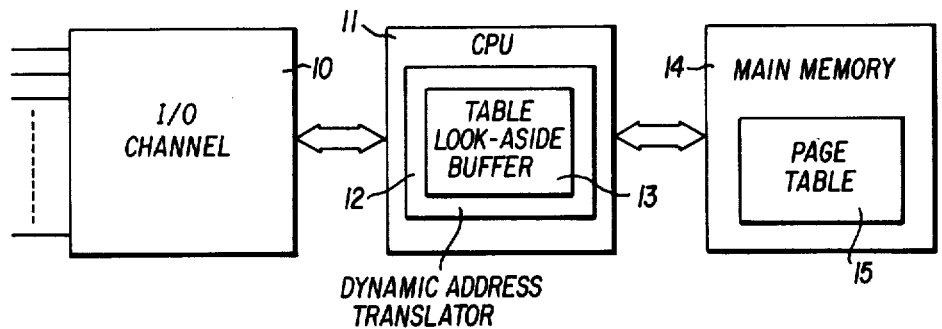
FIG. 1 is a block diagram of a data processing system using virtual addressing as used in the prior art.
Figure 2:
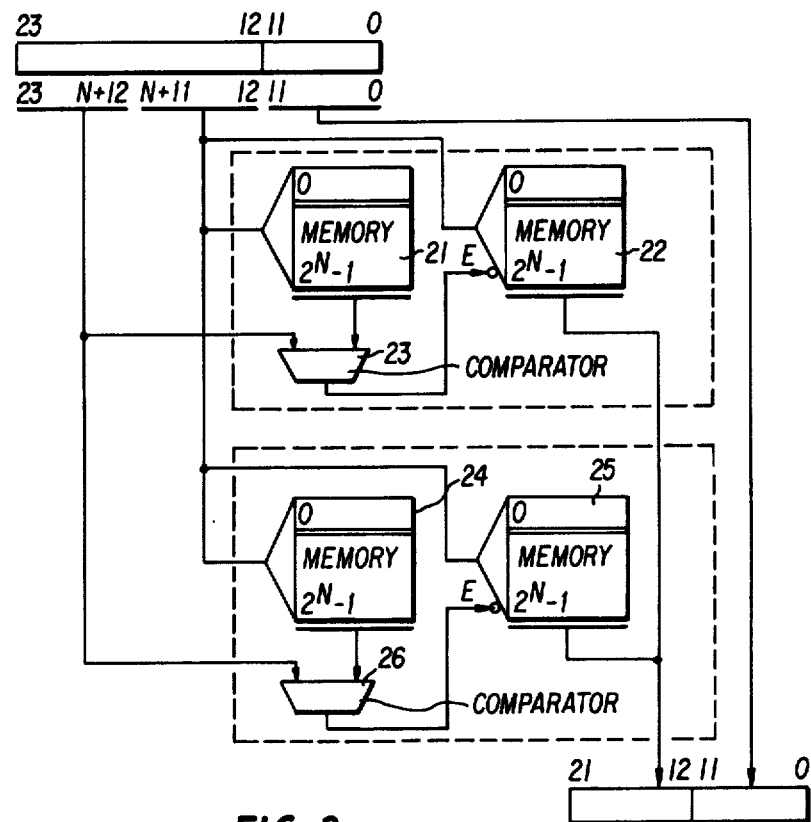
FIG. 2 illustrates the system configuration of the translation look-aside buffer (TLB) as used in the prior art.
Figure 3:
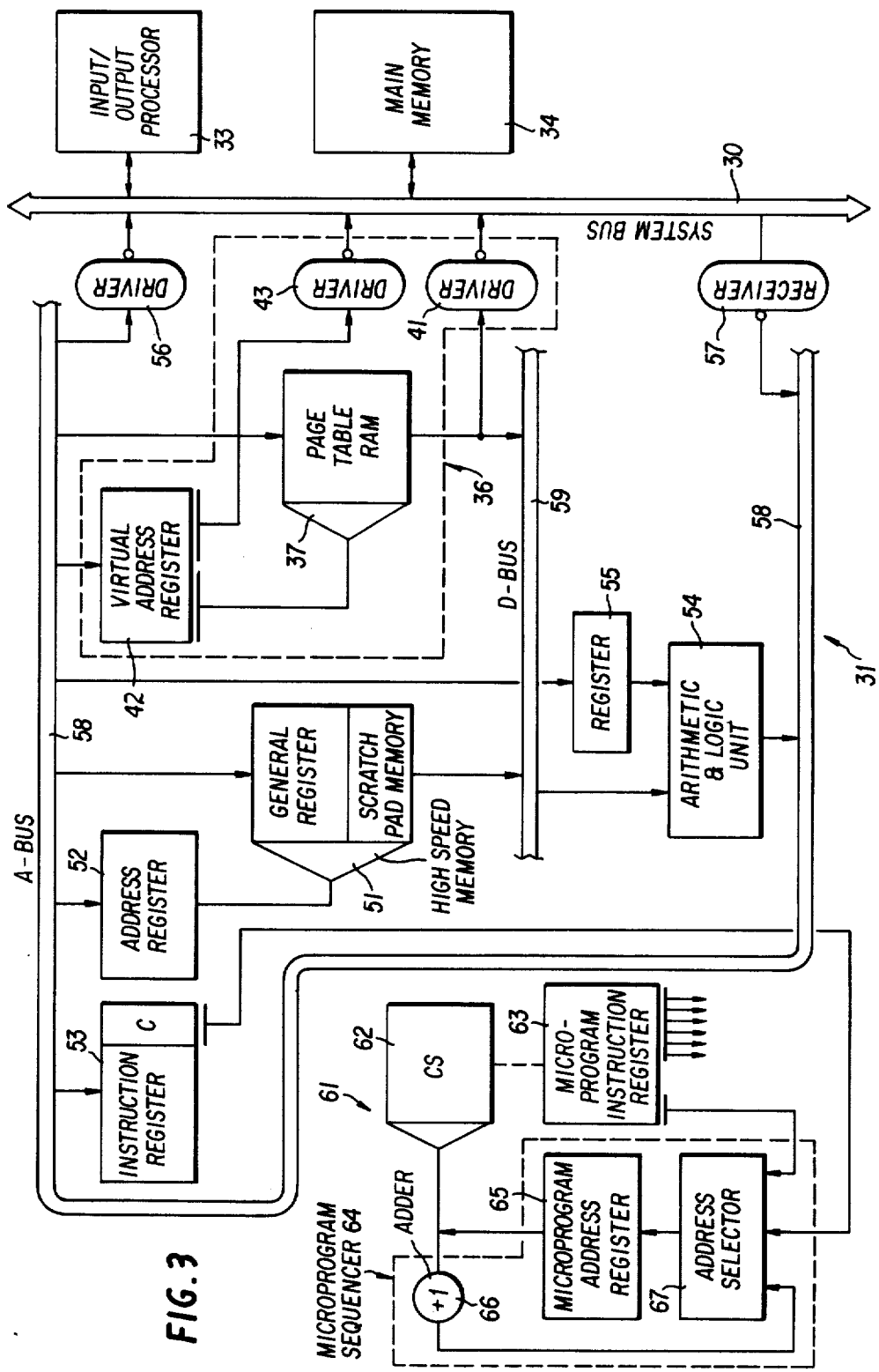
FIG. 3 is a block diagram of an address conversion system according to the present invention.

Referring now to the drawings, wherein like reference numerals designate identical or corresponding parts throughout the several views, and more particularly to FIG. 3 thereof, a block diagram of a data processing system according to the present invention is illustrated. In FIG. 3, a main memory 34 is coupled with a system BUS (S-BUS) 30. An input/output processor (IOP) 33 and a Central Processing Unit (CPU) are connected to the System Bus 30. The Central Processing Unit CPU 31 includes a high speed memory 51. The high speed memory 51 is used as a general register (GR) and as a scratchpad memory (SPM). An arithmetic and a logic unit (ALU) 54 is connected to the high speed memory 51 by way of the D-BUS 59, the A-BUS 58, and a register (REG) 55 and performs various arithmetic and logical operations. The register REG 55 is connected to the D-BUS 59 and the arithmetic and logic unit 54 and temporarily stores the results before or after an operation of the arithmetic and logic unit 54. The A-BUS 58 is connected to the System Bus 30 by way of a driver 56. An instruction code from the main memory 34 is loaded into an instruction register (IR) 53 through the System Bus 30, a receiver 57, and the A-BUS 58. An address register (AR) 52 stores an address of the high speed memory 51. Control memory (CS) 62 stores a microprogram. The microinstruction register (µIR) 63 stores microinstructions from the µIR 63. The microprogram sequencer (µSEQ) 64 includes a microprogram address register (µAR) 65, an adder ciruit (+1) 66, and an address selecter (SEL) 67.

The microprogram sequencer µSEQ 64 forms a real address based on the microprogram stored in the CS 62. The CS 62 is connected to the adder 66 of the microprogram sequencer 64 which is connected to the instruction register IR 53 and to the microinstruction register µIR 63, and selects one address in accordance with the microprogram control. A device similar to the microprogram sequencer µSEQ 64 is described in a manual issued by Advanced Micro Devices Corporation, Microprogram Sequencer AM 2911.

Figure 4:
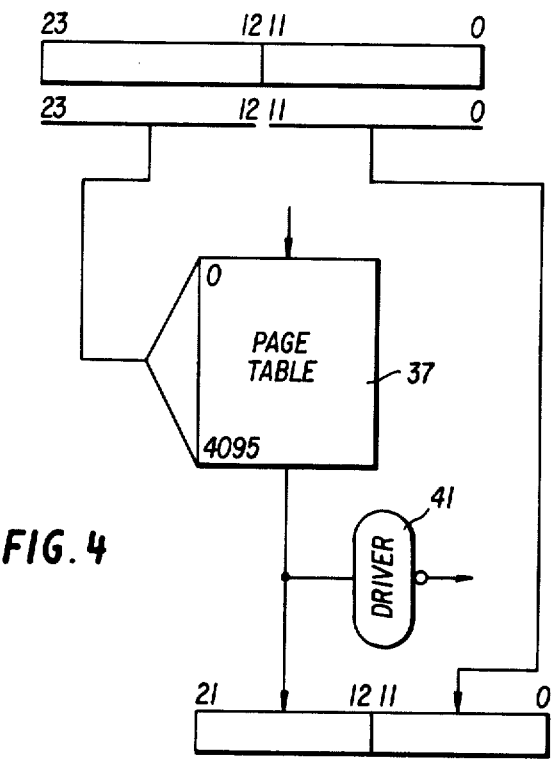
FIG. 4 illustrates a system configuration of an embodiment of the address conversion system of the present invention.

The Central Processing Unit 31 includes a Dynamic Address Translator (DAT) 36. The Dynamic Address Translator 36 includes a memory which stores the page table. The details of the Dynamic Address Translator 36 will be described with reference to FIG. 4. In FIG. 4, the lower 12 BITS (BITS 0-11) of the virtual address correspond to the lower 12 bits of the real address. The upper 12 bits (i.e.), BITS 12-23 shown in FIG. 4); of the virtual address designate the memory address of the page table (PT-RAM) 37. The output of the page table PT-RAM 37 forms not only the upper bits (BITS 12-21) of the real address but also acts as an input to a driver 41. The output of the driver 41 is connected to the system Bus 30 and controls a microprogram of the Central Processing Unit 31 to enable the reading of the output of the Page Table PT-RAM 37 under the control of an internal signal of the Central Processing Unit 31. The microprogram of the Central Processing Unit 31 can write a desired real address in the Page Table PT-RAM 37 to which the A-BUS 58 is connected. The Page Table PT-RAM 37 may be formed from a random access memory of 4096 words.

Figure 5:
FIG. 5 illustrates one word of the page table in the address conversion system of the present invention.

Referring now to FIG. 5, the format of a data word used in the Page Table PT-RAM 37 in FIG. 4 is illustrated. Each word of the Page Table PT-RAM 37 includes upper bits of the real address (i.e., BITS 20-31 shown in FIG. 5) and control bits V, R and C. Bit V is a validity bit to indicate that the upper bit of the real address included in the words should be effective. Bit R is a reference bit to be set to "1" each time the word is accessed. Bit C is a change bit to be set to "1" each time the word is accessed for writing.

Referring back to FIG. 4, the operation of the Dynamic Address translater 36 will be explained when the central processing unit 31 accesses the memory by designating a virtual address. Bits 12-23 of the virtual address given from Central Processing Unit 31 address the Page Table PT-RAM 37. The output of the Page Table PT-RAM 37 becomes bits 12-21 of the real address. Bits 0-11 of the real address use bits 0-11 of the virtual address. The real address obtained in the manner as explained above is transferred to the main memory 34 to address it through the D-BUS 59 shown in FIG. 3. In this embodiment, the input/output processor 33 also addresses the main memory 34 with the real address. The Central Processing Unit translates the virtual address preliminarily into the real address by means of software when it gives a channel program to the input-/output processor.

It is apparent from FIG. 4 that the Dynamic Address Translator 36 is simplified. Almost all of the Dynamic Address Translator 36 is in Page Table PT-RAM 37. The size of the Page Table PT-RAM 37 is twice the capacity of the memories 22 and 25 as in the translation look-aside buffer 13 of the prior art using a memory element of 1K words. Thus the Dynamic Address Translator 36 can be constructed of a hardware equivalent of the Translation look-aside buffer 13 of the prior art. Dynamic Address Translator 12 of the prior art includes not only the Translation look-aside buffer 13 but also an adder and a register for address calculation to access Page Table 15 in the main memory, an access control circuit for the main memory, and a sequential control circuit etc. As a result of locating the page table in the Dynamic Address Translation and not in the main memory, it is unnecessary to prepare the above mentioned circuits and it is only necessary to utilize one half of the hardware. In the near feature, when a high speed static Random Access Memory having a large capacity of 4K words times 4 bits is available, it will further enlarge the merits of the present invention because one memory 22 in the Translation look-aside buffer in FIG.

2 is similar in size to the Page Table PR-RAM 37 in FIG. 4.

Now referring to FIG. 6, a PTH instruction i.e., an instruction to modify the Page Table 37, will be explained as follows. The format of the PTH instruction and the usage of it by a general register are shown in FIG. 6. The PTH instruction provides the means by which the operating system defines and revises the Page Table 37 within the Dynamic Address Translator 36.

When it is necessary to utilize the Central Processing Unit, it is convenient to address it via software using the Page Table if the necessary hardware is available to write such contents as to translate the same real address to the virtual address within the real address of the Page Table PT-RAM 37. The PTH instruction includes a portion serving as an instruction code (OP), another portion to indicate the general register, and a portion (C) for variation of itself. With respect to the PTH instruction, a general register GRn stores the virtual address and the general register stores the upper 16 bits of a word of the Page Table. In the present embodiment of the present invention, the virtual address is stored in the general register. It is possible to design an instruction format to designate a virtual address by a portion of the instruction word. This variation of the PTH instruction by the C bit is as follows. In the following explanation each word in the Page Table is referred to as a page table entry (PTE).

C−1: Set Page Table Entries

Write the upper 16 bits of the general register GRn+1 into the page table entry PTE designated by the virtual address in the general register GRn. Each entry of the page table PT is formed by 13 bits of information. In the present embodiment the 31st bit, the 30th bit, and the 16th bit are extended bits, i.e., bits which are not actually entered or stored in the page table.

C=2: Read Page Table Entries

Set the page table entry designated by the virtual address in the general register GRn to the upper 16 bits of the general register GRn+1.

C=3: Reset Reference Bits

Reset the R bit of the page table entry designated by the virtual address in the general register GRn to zero.

FIG. 7 is a flow chart of an embodiment of the Page Table entry instruction. The operation of the Central Processing unit thus constructed will now be described referring to FIG. 7. The Central Processing Unit 31 reads the software instruction using the Main Memory 34. The instruction read is set into the instruction register 53 through the A-BUS 58 from the System Bus 30. The instruction code OP set in the instruction register 53 is decoded by) SEQ 64. When the contents of the instruction code OP is the PTH instruction, the control is removed to the) SEQ 64, where the microprogram routine for implementing the PTH instruction is performed. In other words, the variation of the PTH instruction is judged by the C bit. The head address for processing the microprogram corresponds to the variation in the control bit C is determined.

When the control bit is (C−1), the microprogram processing routine is as follows. The contents of the general register GRn are given as the virtual address, and the contents of the general register GRn+1 cause the Page Table PT-RAM 37 to write through the D-BUS 59. The high speed memory SPM 51 is addressed by the contents of the address register AR 52, and the contents obtained (the page number, the displacement) is sent through the D-BUS 59, the arithmetic and logic unit ALU 54, and the A-BUS 58 to a virtual address register (VAR) 42. At the same time, the high speed memory SPM (GRn+1 51 is addressed in accordance with the addition of +1 to the contents of the address register AR 52 and the one word of the page table is sent through the D-BUS 59, the Arithmetic and logic unit ALU 54, and the A-BUS 58 to the register REG 55. The one word of the Page Table PT in the register REG 55 is written in the Page Table PT-RAM 37 in accordance with the upper bits of the virtual address in the virtual address register VAR 41.

When the control bit is (C=2), the microprogram processing routine is as follows. The contents of the General Register GRn are given as the virtual address. The Page table entry PTE indicated by bits 23–12 of the General register GRn is read from the page table PT-RAM 37 and is loaded into the upper 16 bits of the general register GRn+1. That is to say, the high speed memory SPM 51 is addressed by the contents of the address register AR 52, and the contents thus obtained (the page number, the displacement) are sent through the D-BUS 59, the arithmetic and logic unit ALU 54, and A-BUS to the Virtual Address register VAR 41. The Page Table PT-RAM 37 is addressed by the page number (bits 12-23) of the virtual address register VAR, and the contents of the Page Table PT-RAM 37 are obtained and are transferred through the D-BUS 59, the arithmetic and logic unit ALU 54, and the A-BUS to the high speed memory SPM 51 (GRn+1). At the same time, to the contents of the address register AR 52 is added +1.

When the control bit is (C=3), the microprogram procesing routine is as follows. The Page Table Entry PTE indicated by bits 23–12 of the general register GRn is read from the Page Table PT-RAM 37 and is loaded into the arithmetic and logic unit ALU 54. Bit 18 (the R bit) of the arithmetic and logic unit ALU 54 is reset, and the real address is written in the same portion of the Page Table PT-RAM 37.

It is clear from the foregoing, in the address conversion system according to the present invention, the hardware of the Dynamic Address Translator DAT is simplified and can be relatively small. The time necessary for address translation is made shorter, because the address for translating is accessed in the main memory.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A virtual memory data processing system comprising:
   main memory means for storing instructions and data;
   second memory means for storing an entire address conversion table comprising a plurality of entries each of which includes a plurality of control bits and a portion of a real address corresponding to a continuous portion of the bits which form a virtual address and to each of which an address defined by said continuous portion of the corresponding virtual address is assigned;

instruction execution means for executing said instructions in said main memory means and supplying said second memory means with a virtual address to access said main memory means;

second memory addressing means for addressing said second memory means by said continuous portion of said virtual address supplied by said instruction execution means both for the purpose of address conversion and for the purpose of updating the address conversion table, said continuous portion including the effective most upper bit of said virtual address;

main memory addressing means for concatenating said portion of a real address delivered from said second memory means for address conversion and the remaining part of said virtual address supplied by said instruction execution means so that said instruction execution means access said main memory;

said instructions including at least one instruction for handling contents of said entry in said second memory means; and said instruction execution means revising the contents of said second memory means only when said at least one second memory handling instruction is executed and referencing the contents of said second memory means only for the purpose of address conversion when an instruction other than said at least one second memory handling instruction is executed.

2. A virtual memory data processing system as recited in claim 1, wherein said at least one instruction comprises:

an operation code part for defining an instruction as said second memory handling instruction, a part for designating a virtual address, and an auxiliary operation designating part for designating a plurality of operations including an operation for setting the contents of said entry and an operation for handling said control bits of said entry.

3. A virtual memory data processing system as recited in claim 2, further comprising:

register means for storing address information for accessing an entry of said second memory means;

said part of said second memory handling instruction for designating a virtual address designating a said register means; and address information stored in said register means designated by said part being supplied to said second memory addressing means when said instruction execution means executes the second memory handling instruction.

* * * * *